US011922320B2

(12) United States Patent
Jaipuria et al.

(10) Patent No.: US 11,922,320 B2
(45) Date of Patent: Mar. 5, 2024

(54) NEURAL NETWORK FOR OBJECT DETECTION AND TRACKING

(71) Applicant: Ford Global Technologies, LLC, Dearborn, MI (US)

(72) Inventors: Nikita Jaipuria, Union City, CA (US); Eric Frankel, Paradise Valley, AZ (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/342,640

(22) Filed: Jun. 9, 2021

(65) Prior Publication Data

US 2022/0398461 A1 Dec. 15, 2022

(51) Int. Cl.
*G06N 3/084* (2023.01)
*G06N 3/045* (2023.01)
(Continued)

(52) U.S. Cl.
CPC .............. *G06N 3/084* (2013.01); *G06N 3/045* (2023.01); *G06T 3/00* (2013.01); *G06T 7/20* (2013.01);
(Continued)

(58) Field of Classification Search
CPC .......... G06N 3/084; G06N 3/045; G06T 3/00; G06T 7/20; G06T 7/70;
(Continued)

(56) References Cited

U.S. PATENT DOCUMENTS 10,614,310 B2 * 4/2020 Polak .................... G06V 40/20
10,885,776 B2 * 1/2021 Amacker ............... G08G 1/165
(Continued)

FOREIGN PATENT DOCUMENTS

CN 110728203 A 1/2020
WO 2020226696 A1 11/2020

OTHER PUBLICATIONS

Jaipuria,, N., et al., "Deflating Dataset Bias Using Synthetic Data Augmentation," arXiv:2004.13866v1 [cs.CV], Apr. 28, 2020, 17 pages.

(Continued)

*Primary Examiner* — Edward F Urban
*Assistant Examiner* — Benedict E Lee
(74) *Attorney, Agent, or Firm* — Frank A. MacKenzie; Bejin Bieneman PLC

(57) ABSTRACT

A dual variational autoencoder-generative adversarial network (VAE-GAN) is trained to transform a real video sequence and a simulated video sequence by inputting the real video data into a real video decoder and a real video encoder and inputting the simulated video data into a synthetic video encoder and a synthetic video decoder. Real loss functions and simulated loss functions are determined based on output from a real video discriminator and a simulated video discriminator, respectively. The real loss functions are backpropagated through the real video encoder and the real video decoder to train the real video encoder and the real video decoder based on the real loss functions. The synthetic loss functions are backpropagated through the synthetic video encoder and the synthetic video decoder to train the synthetic video encoder and the synthetic video decoder based on the synthetic loss functions. The real video discriminator and the synthetic video discriminator can be trained to determine an authentic video sequence from a fake video sequence using the real loss functions and the synthetic loss functions. The annotated simulated video can be transformed with the synthetic video encoder and the real video decoder of the dual VAE-GAN to generate a reconstructed annotated real video sequence that includes style elements based on the real video sequence. A second neural network is trained using the reconstructed annotated real video sequence to detect and track objects.

20 Claims, 8 Drawing Sheets

(51) Int. Cl.
*G06T 3/00* (2006.01)
*G06T 7/20* (2017.01)
*G06T 7/70* (2017.01)

(52) U.S. Cl.
CPC ...... *G06T 7/70* (2017.01); *G06T 2207/10016* (2013.01); *G06T 2207/20081* (2013.01); *G06T 2207/20084* (2013.01); *G06T 2207/30252* (2013.01)

(58) Field of Classification Search
CPC . G06T 2207/10016; G06T 2207/20081; G06T 2207/20084; G06T 2207/30252; G06V 20/00
See application file for complete search history.

(56) References Cited

U.S. PATENT DOCUMENTS

| | | | |
|---|---|---|---|
| 11,106,903 B1* | 8/2021 | Huynh | G06V 10/82 |
| 11,170,568 B2* | 11/2021 | Kaushik | G06N 3/08 |
| 11,328,402 B2* | 5/2022 | Tang | G06T 7/0002 |
| 11,568,576 B1* | 1/2023 | Martinez | G06T 7/11 |
| 2019/0287217 A1* | 9/2019 | Cooke | G06N 3/045 |
| 2020/0065635 A1* | 2/2020 | Lim | G06N 3/047 |
| 2020/0097766 A1 | 3/2020 | Min et al. | |
| 2021/0064907 A1* | 3/2021 | Yang | G06F 18/2155 |
| 2021/0081843 A1* | 3/2021 | Banijamali | G06N 3/088 |
| 2021/0129871 A1* | 5/2021 | Malla | G06T 7/70 |
| 2021/0358137 A1* | 11/2021 | Lee | G06T 7/246 |
| 2023/0005114 A1* | 1/2023 | Shin | G06V 10/7715 |

OTHER PUBLICATIONS

Jaipuria. N., et al., "On the Role of Receptive Field in Unsupervised Sim-to-Real Image Translation," Machine Learning for Autonomous Driving Workshop at the 33rd Conference on Neural Information Processing Systems, Vancouver, Canada, Jan. 25, 2020, 8 pages.

Liu, M., et al, "Unsupervised Image-to-Image Translation Networks," 31st Conference on Neural Information Processing Systems, Long Beach, CA, Jul. 23, 2018.

Mallya, A., et al., "World-Consistent Video-to-Video Synthesis," https://nvlabs.github.io/wc-vid2vid/, Jul. 16, 2020, 25 pages.

Shen, X., et al., "Sequence-to-Sequence Learning via Shared Latent Representation," UBTECH Sydney Artificial Intelligence Institute, SIT, FEIT, University of Sydney, Australia. 2018, 8 pages.

Sun. X., et al., "TwoStreamVAN: Improving Motion Modeling in Video Generation," arXiv:, 812.01037v2 [cs.CV], Jan. 10, 2020, 18 pages.

Wang, T., et al., "Video-to-Video Synthesis," arXiv:1808.06601v2 [cs.CV], Dec. 3, 2018, 14 pages.

Zhu, J., et al., "Unpaired Image-to-Image Translation using Cycle-Consistent Adversarial Networks," arXiv:1703.10593v7 [cs.CV], Aug. 24, 2020, 18 pages.

* cited by examiner

NEURAL NETWORK FOR OBJECT DETECTION AND TRACKING

BACKGROUND

Deep neural networks can be trained to perform a variety of computing tasks. For example, neural networks can be trained to extract data from images. Data extracted from images by deep neural networks can be used by computing devices to operate systems including vehicles, robots, security, and product handling (e.g., for manufacturing) systems. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

Figure 1:
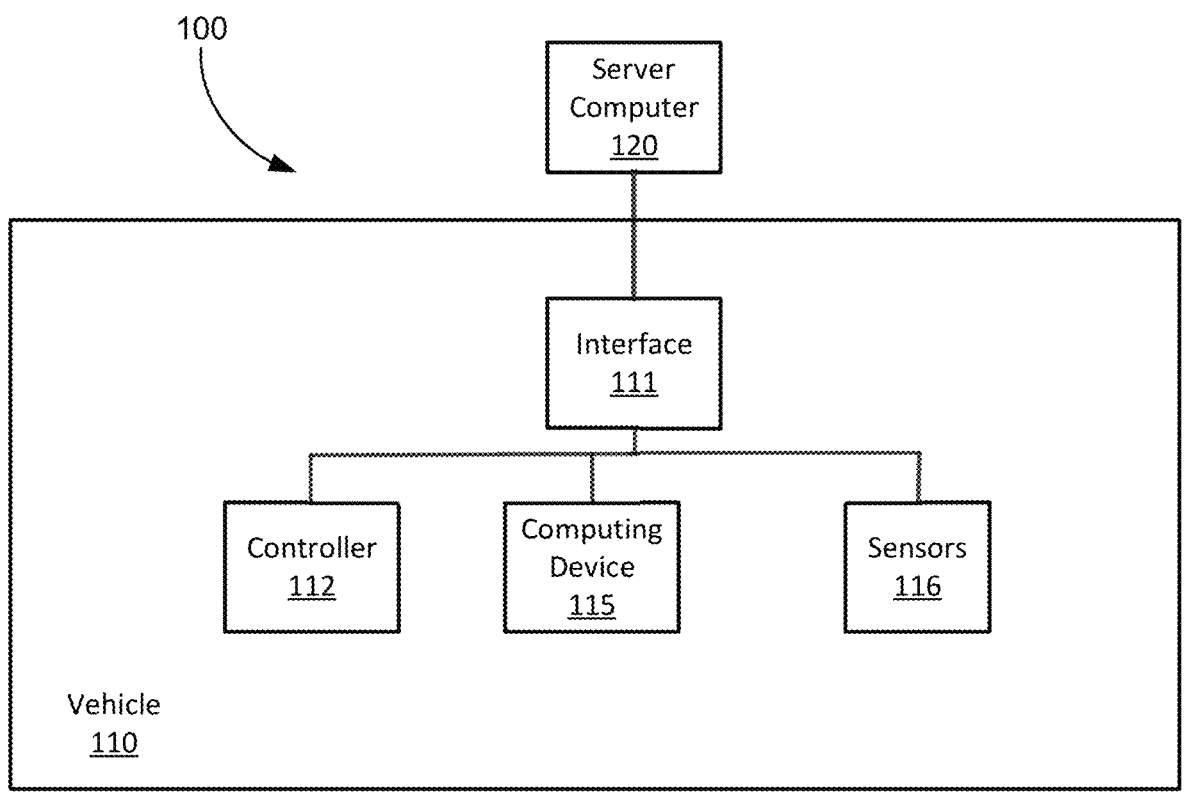
FIG. 1 is a block diagram of an example object recognition system.

A deep neural network can be trained to determine objects in image data acquired by system sensors using a training dataset that includes a large number (typically >1000) of annotated images. An annotated image is an image that includes data corresponding to objects included in the image. In examples where the deep neural network is included in a vehicle, the objects can include vehicles and pedestrians. In examples where the deep neural network is included in a robot, the objects can be parts to be assembled or packages to be shipped. In security or safety applications the objects can be humans or portions of humans, i.e., human hands and feet. Annotating a large dataset for training a deep neural network can require thousands of hours of significant costs. Techniques described herein can greatly increase efficiency of data collections and annotation of a dataset including video sequences by generating annotated simulated video sequences that include photorealistic renderings of environmental conditions using a dual variational autoencoder-generative adversarial network and thereby decrease the time and expense required to generate an annotated dataset.

The data corresponding to the objects can include a label that identifies the type of object, and a location of the object in pixel coordinates or real world coordinates with respect to the camera that acquired the image. The data corresponding to the objects can also include a size of the object in pixel or real world coordinates and an orientation of the object with respect to the camera that acquired the image Acquiring and annotating video data permits acquisition of a large volume of training data that can be used to train deep neural networks for perception tasks such as object tracking. Object tracking is accomplished by determining object locations in a sequence of video frames and determining an object trajectory that includes object direction and speed. The frames of video data acquired in this fashion can be used to train a deep neural network to detect and track objects, where detecting objects in this context means determining a label and a location for objects in an image and tracking means determining object locations in a plurality of video frames.

Acquiring and annotating video data for use in training a deep neural network can be an expensive and time consuming task. Typically, the video data is acquired using cameras mounted on a vehicle and driven through scenes that include objects to be detected. The acquired video is then processed using image processing workstations that permit humans to pause each frame of video data, locate and label the objects in the frame, and store the label and location data with data identifying which video and which video frame the label and location data corresponds to. Techniques discussed herein improve upon data collection and manual annotation of acquired video data by generating simulated video data using photorealistic video rendering software. An example of photorealistic video rendering software is Unreal Engine, from Epic Games, Inc, Cary, NC, 27518. Photorealistic video rendering software can generate annotated video data much more efficiently, including in much less time and in far fewer computing cycles, than the resources typically required to acquire and annotate real video data.

Simulated video data is generated by first describing a scene including objects with a scene description file. The scene description file includes data that describes backgrounds and objects in terms of their three-dimensional (3D) volumes and locations. The scene description file also can include surface textures and colors to be applied to the 3D volumes. The photorealistic video rendering software includes a simulated camera that produces images of the simulated scene described by the scene description file that simulates a real world camera having a lens and image sensor acquiring images from a specified location and orientation with respect to the scene. The photorealistic video rendering software can then move the simulated camera through the scene along a path while generating images to simulate acquiring video data with a real world video camera. Because the location and orientation of the simulated camera with respect to the objects in the scene description file is determined by the path along which the simulated camera is moved in the simulated scene, annotations including object labels and object locations can be automatically generated based on the scene description file and data regarding the simulated camera.

When training a deep neural network, the more closely a training dataset compares to the range of real world environmental conditions included in images the deep neural network will encounter in real world operation, the more accurate the deep neural network can be expected to be. Accuracy in the context of a deep neural network detecting and tracking objects means the rate at which a deep neural network correctly detects and tracks objects in input image data. Environmental conditions include lighting, which can range from bright sunlight to dark night, including artificial lighting, and weather, which can include atmospheric effects such as rain, snow, and fog, etc., and seasons, which can include foliage such as bare branches or leaves and snow cover. Generating annotated real video data that encompasses the range of environmental conditions systems operating in the real world is a very expensive and time consuming task. For example, acquiring real video sequences that include a variety of environmental conditions is an extremely time-consuming, expensive and sometimes dangerous task. For example, acquiring a real video sequence can require waiting for the correct environmental conditions (i.e., night, snowstorm), making sure the correct objects (i.e., vehicles, pedestrians) are in the scene, and then acquiring video data and ground truth in extreme conditions.

Techniques discussed herein augment annotated real-world video data by transforming real video data to simulate a variety of environmental conditions and transforming annotated simulated video data to generate synthetic video data that include realistic real world environmental conditions. By transforming both real video data and simulated video data techniques to include a variety of environmental conditions training datasets can be generated for deep neural networks that cover the environmental conditions expected to be encountered by deep neural networks in real world vehicles at a fraction of the time and cost of acquiring real world video datasets. For example, a real video sequence can be acquired on a clear, sunny day. Techniques discussed herein can input the real video sequence to trained deep neural networks and output a plurality of video sequences that include a more diverse set of environmental conditions such as rain, snow, nighttime, etc. Techniques discussed herein can also generate a simulated video sequence and input the simulated video sequence to trained deep neural networks to quickly and inexpensively generate a plurality of realistic video sequences that include a diverse set of environmental conditions.

Typical video style transfer techniques for diversifying annotated real datasets and translating annotated simulated data to look photorealistic rely on supervised learning, where paired videos are needed from both domains (sim/real, day/night etc.). Techniques discussed herein use unsupervised learning, where a dual variational autoencoder-generative adversarial network can be trained to transform real video data to include a plurality of environmental conditions and simulated data can be transformed to generate realistic video data which include a plurality of environmental conditions. Unsupervised training does not require paired data to permit training by using a dual variational autoencoder-generative adversarial network architecture that includes a shared latent space as will be discussed in relation to FIG. 2, below. In this context paired data refers to real video sequences that are identical except for environmental conditions and simulated video sequences that mimic real video sequences.

Techniques discussed herein moreover improve generation of reconstructed video sequences by providing a technique for employing video discriminators on both real and synthetic data. Video discriminators can reduce the time and computing resources required to generated reconstructed video sequences over recurrent or three-dimensional (3D) convolutional neural networks while obtaining equivalent results. Generating video sequences using single frame neural network technology can create problems with flickering and difficulty in smooth object motion between frames. Techniques for reconstructing video sequences using neural networks typically include conditional generative adversarial networks (GANs) and recurrent neural networks. Techniques discussed herein use video discriminators for training a variational autoencoder-generative adversarial network to generate both real and synthetic video sequences, thereby requiring far fewer computer resources than recurrent neural networks. Conditional GAN techniques use supervised learning, which typically requires either paired data or detailed annotation such as segmentation masks which identify and locate objects in video data. Techniques discussed herein improve over conditional GAN techniques by using unsupervised learning, which relies on neither paired data nor on any type of annotation.

Deep neural networks trained using annotated synthetic video data generated by techniques discussed herein can be used for tasks including vehicle guidance, robot guidance, security applications, safety applications and product tracking applications. Security applications include applications where a computer acquires video data from a camera observing a secure area. A deep neural network executing on the computer can detect intrusion of humans into the secure area, for example. In a safety application, a deep neural network in a computer can detect unsafe operation of machinery in a manufacturing operation by determining a location of a person's hands at a particular time in relation to a machine operating cycle, for example. In a product tracking application, a deep neural network can detect a person removing an object from a shelf and putting it into a shopping cart and automatically charge the person for the object, for example.

Vehicle guidance will be described herein as a non-limiting example of training a deep neural network using annotated synthetic data. For example, a computing device in a vehicle can be programmed to acquire image data regarding the external environment of a vehicle and detect objects in the image data using a deep neural network. The data can include image data acquired from a still or video camera, range data acquired from a lidar sensor or radar data acquired from a radar sensor. A deep neural network can be trained to label and locate objects in the image data, range data, or radar data. The computing device can use the identity and location of the detected objects to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path.

Disclosed herein is a method including training a dual variational autoencoder-generative adversarial network (VAE-GAN) to transform a real video sequence and a simulated video sequence by inputting the real video sequence into a real video decoder and a real video encoder and inputting the simulated video sequence into a synthetic video encoder and a synthetic video decoder and determining real loss functions and synthetic loss functions based on output from a real video discriminator and a synthetic video discriminator, respectively. The real loss functions can be backpropagated through the real video encoder and the real video decoder to train the real video encoder and the real video decoder based on the real loss functions and the synthetic loss functions can be backpropagated through the synthetic video encoder and the synthetic video decoder to train the synthetic video encoder and the synthetic video decoder based on the synthetic loss functions. The real video discriminator and the synthetic video discriminator can be trained to determine an authentic video sequence from a fake video sequence using the real loss functions and the synthetic loss functions. An annotated simulated video sequence can be transformed with the synthetic video encoder and the real video decoder of the dual VAE-GAN to generate an annotated reconstructed real video sequence that includes style elements based on the real video sequence and a deep neural network can be trained using the reconstructed annotated real video sequence to detect and track objects in video data.

The deep neural network can be trained based on comparing ground truth for the objects with output from the deep neural network. The ground truth can be determined based on data describing the objects included in the annotated reconstructed real video sequence. The style elements can include environmental conditions including lighting, weather, and seasons. The annotated simulated video sequence can be generated with photorealistic video rendering software. Annotations can be based on data describing the objects included in the annotated reconstructed real video sequence. The dual VAE-GAN can include a shared latent space including latent variables corresponding to both the real video sequence and the simulated video sequence. The real video discriminator and the synthetic video discriminator can be convolutional neural networks. The deep neural network can be a recurrent convolutional deep neural network. A vehicle can be operated based on detecting and tracking the objects in the video data with the recurrent convolutional deep neural network. The dual VAE-GAN can be trained for reconstruction loss using loss functions $V_{A2A}-V_A$ and $V_{B2B}-V_B$ for real video sequences and simulated video sequences, respectively. The dual VAE-GAN can be trained for cycle consistency using loss functions $V_{A2B2A}-V_A$ and $V_{B2A2B}-V_B$ for real video sequences and simulated video sequences, respectively. The real image discriminator and synthetic image discriminator can be trained for cross translation and cycle consistency using loss functions $D_{IA}(V_{B2A})-1$, $D_{IB}(V_{A2B})-1$, $D_{IA}(V_{A2B2A})-1$, and $D_{IB}(V_{B2A2B})-1$. The real video discriminators and synthetic video discriminators can be trained for cross translation and cycle consistency using loss functions $D_{VA}(V'_{B2A})-1$, $D_{VB}(V'_{A2B})-1$, $D_{VA}(V'_{A2B2A})-1$, and $D_{VB}(V'_{B2A2B})-1$.

Further disclosed is a computer readable medium, storing program instructions for executing some or all of the above method steps. Further disclosed is a computer programmed for executing some or all of the above method steps, including a computer apparatus, programmed to train a dual variational autoencoder-generative adversarial network (VAE-GAN) to transform a real video sequence and a simulated video sequence by inputting the real video sequence into a real video decoder and a real video encoder and inputting the simulated video sequence into a synthetic video encoder and a synthetic video decoder and determining real loss functions and synthetic loss functions based on output from a real video discriminator and a synthetic video discriminator, respectively. The real loss functions can be backpropagated through the real video encoder and the real video decoder to train the real video encoder and the real video decoder based on the real loss functions and the synthetic loss functions can be backpropagated through the synthetic video encoder and the synthetic video decoder to train the synthetic video encoder and the synthetic video decoder based on the synthetic loss functions. The real video discriminator and the synthetic video discriminator can be trained to determine an authentic video sequence from a fake video sequence using the real loss functions and the synthetic loss functions. An annotated simulated video sequence can be transformed with the synthetic video encoder and the real video decoder of the dual VAE-GAN to generate an annotated reconstructed real video sequence that includes style elements based on the real video sequence and a deep neural network can be trained using the reconstructed annotated real video sequence to detect and track objects in video data.

The computer can be further programmed to train the deep neural network based on comparing ground truth for the objects with output from the deep neural network. The ground truth can be determined based on data describing the objects included in the annotated reconstructed real video sequence. The style elements can include environmental conditions including lighting, weather, and seasons. The annotated simulated video sequence can be generated with photorealistic video rendering software. Annotations can be based on data describing the objects included in the annotated reconstructed real video sequence. The dual VAE-GAN can include a shared latent space including latent variables corresponding to both the real video sequence and the simulated video sequence. The real video discriminator and the synthetic video discriminator can be convolutional neural networks. The deep neural network can be a recurrent convolutional deep neural network. A vehicle can be operated based on detecting and tracking the objects in the video data with the recurrent convolutional deep neural network. The dual VAE-GAN can be trained for reconstruction loss using loss functions $V_{A2A}-V_A$ and $V_{B2B}-V_B$ for real video sequences and simulated video sequences, respectively. The dual VAE-GAN can be trained for cycle consistency using loss functions $V_{A2B2A}-V_A$ and $V_{B2A2B}-V_B$ for real video sequences and simulated video sequences, respectively. The real image discriminator and synthetic image discriminator can be trained for cross translation and cycle consistency using loss functions $D_{IA}(V_{B2A})-1$, $D_{IB}(V_{A2B})-1$, $D_{IA}(V_{A2B2A})-1$, and $D_{IB}(V_{B2A2B})-1$. The real video discriminators and synthetic video discriminators can be trained for cross translation and cycle consistency using loss functions $D_{VA}(V'_{B2A})-1$, $D_{VB}(V'_{A2B})-1$, $D_{VA}(V'_{A2B2A})-1$, and $D_{VB}(V'_{B2A2B})-1$.

FIG. 1 is a diagram of an object recognition and tracking system 100 for training and deploying a deep neural network programmed for object recognition, as will be described in relation to FIGS. 2-5. Object recognition and tracking system 100 in the illustrated example includes a vehicle 110 with a computing device 115 programmed for object recognition and tracking as in the illustrated example, but it is to be understood that object recognition and tracking system 100 could likewise include a computing device 115 programmed for object recognition and tracking in conjunction with other environments, e.g., for a robot, a security system, a safety system, or some other system. Object recognition and tracking system can 100 include one or more computing devices 115 which receive data from one or more sensors 116, and, based on data received from the one or more sensors 116 determine commands to be communicated to one or more controllers 112 to control operation of the vehicle, robot, security system, safety system, or product tracking system. In examples in which the object recognition and tracking system 100 is included a vehicle 110, one or more computing devices 115 can receive data regarding the operation of the vehicle 110 from sensors 116. The computing device 115 may operate the vehicle 110 in an autonomous mode, a semi-autonomous mode, or a non-autonomous mode as described below.

The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computing device 115, as opposed to a human operator, is to control such operations. In other examples the computing device can operate robot arms or grippers, lock or unlock doors, enable or prevent operation of a machine or record movement of a product.

The computing device 115 may include or be communicatively coupled to, e.g., via a communications bus as described further below, more than one computing devices, e.g., controllers or the like included in the object recognition and tracking system 100 for monitoring and/or controlling various components via one or more controllers 112. For example, an object recognition and tracking system 100 in a vehicle 110 can include a powertrain controller, a brake controller, a steering controller, etc. The computing device 115 is generally arranged for communications on a communication network, e.g., including a bus in the object recognition and tracking system 100 such as a controller area network (CAN) or the like; the object recognition and tracking system 100 network can additionally or alternatively include wired or wireless communication mechanisms such as are known, e.g., Ethernet or other communication protocols.

Via the network, the computing device 115 may transmit messages to various devices in the object recognition and tracking system 100 and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the communication network.

In addition, the computing device 115 may be configured for communicating through an interface 111 with a remote server computer 120, e.g., a cloud server, via a network, which, as described below, includes hardware, firmware, and software that permits computing device 115 to communicate with a remote server computer via a network such as wireless Internet (WI-FI®) or cellular networks. Interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through interface 111 using short range networks, e.g., according to cellular communications (e.g., what is known as CV2X), Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the system communication network and via interface 111 to a server computer 120 or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle operational behaviors (i.e., physical manifestations of vehicle operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112 for the vehicle 110 may include conventional electronic control units (ECUs) or the like including, as non-limiting examples, one or more powertrain controllers, one or more brake controllers, and one or more steering controllers. Each of the one or more controllers 112 may include respective processors and memories and one or more actuators. The controllers 112 may be programmed and connected to an object recognition and tracking system 100 communications bus, such as a controller area network (CAN) bus or local interconnect network (LIN) bus, to receive instructions from the computing device 115 and control actuators based on the instructions.

Sensors 116 may include a variety of devices known to provide data via the vehicle 110 communications bus. For example, a radar fixed to a front bumper (not shown) of the vehicle may provide a distance from the vehicle to a next vehicle in front of the vehicle, or a global positioning system (GPS) sensor disposed in the vehicle may provide geographical coordinates of the vehicle. The distance(s) provided by the radar and/or other sensors 116 and/or the geographical coordinates provided by the GPS sensor may be used by the computing device 115 to operate the vehicle autonomously or semi-autonomously, for example.

The vehicle 110 can be a land-based vehicle capable of autonomous and/or semi-autonomous operation and having three or more wheels, e.g., a passenger car, light truck, etc. The vehicle 110 includes one or more sensors 116, the interface 111, the computing device 115 and one or more controllers 112. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles. The sensors 116 may further be used to collect data including dynamic vehicle 110 data related to operations of the vehicle 110 such as velocity, yaw rate, steering angle, engine speed, brake pressure, oil pressure, the power level applied to controllers 112 in the vehicle 110, connectivity between components, and accurate and timely performance of components of the vehicle 110.

Object recognition and tracking system 100 can be included in a vehicle 110, operable in autonomous ("autonomous" by itself in this disclosure means "fully autonomous"), semi-autonomous, and occupant piloted (also referred to as non-autonomous) mode. By a semi- or fully-autonomous mode, we mean a mode of operation wherein a vehicle 110 can be piloted partly or entirely by a computing device as part of a system having sensors 116 and controllers 112. The vehicle 110 can be occupied or unoccupied, but in either case the vehicle 110 can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computing devices 115; in a semi-autonomous mode the vehicle computing device(s) 115 control(s) one or more of vehicle propulsion, braking, and steering. In a non-autonomous mode, none of these are controlled by a computer computing device 115.

Object recognition and tracking system 100 can include, alternative to a vehicle 110, a robot, a security system, a safety system, or a product tracking system. Computing device 115 can acquire data from sensors 116 included in a robot, a security system, a safety system, or a product tracking system and control actuators included in the robot, security system, safety system, or product tracking system via one or more controllers 112. For example, an object recognition and tracking system 100 included in a robot can acquire data regarding objects in a field of view of sensors 116 and direct one or more controllers 112 to cause a robot arm to move a robot's end effector, such as a gripper, into position to grasp the object. The grasped object can then be moved into position to be assembled with other objects or placed into a shipping container, for example. A computing device 115 in a security system can lock or unlock a door based on identifying a person seeking entry to a building or room. A computing device 115 in a safety system can prevent a machine from operating when a person's hand is detected in a non-safe location with respect to the machine. A computing device 115 in a product tracking system can monitor movement of a product, e.g., removal from a shelf, placement on a conveyor or platform, etc.

Figure 2:
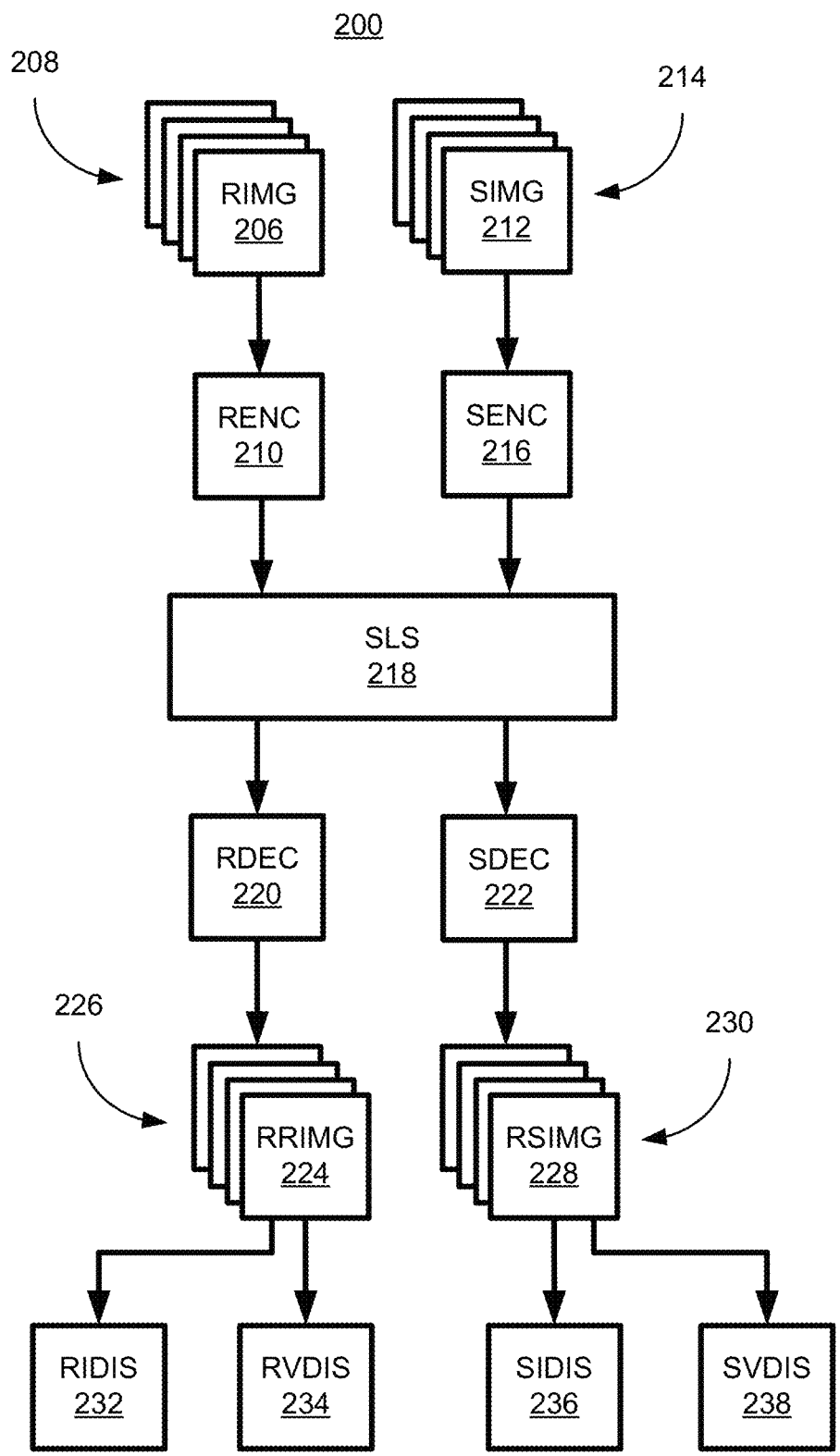
FIG. 2 is a diagram of an example dual variational autoencoder generative adversarial neural network.

FIG. 2 is a diagram of a dual variational autoencoder generative adversarial network (VAE-GAN) 200. The dual VAE-GAN 200 is a software program executing on server computer 120 or computing device 115. The dual VAE-GAN 200 receives as input a real video sequence 208 including a plurality of real images (RIMG) 206 and processes the real video sequence with a real encoder (RENC) 210. A real video sequence 208 is data acquired by a video camera from a real world scene and includes a plurality of real images 206, e.g., frames in a video sequence. The real encoder 210 is a 2D convolutional neural network that inputs the real video sequence 208 as a batch of real images 206 with batch size equal to sequence length and processes it to form latent variables corresponding to the real video sequence 208. The latent variables are compressed versions of the real video sequence 208 that retain selected features of the real video sequence 208 including features selected to identify the location and identity of objects and features captured in the real video sequence 208. Objects and features in the real video sequence 208 can include environmental conditions including lighting, weather, and seasonal aspects of the real video sequence 208.

The real encoder 210 processes a video sequence 208 by batching k frames of video data into a three-dimensional array that includes the k frames. For example, a frame of RGB video data can includes three channels (bytes) of color data. If the frame is h pixels high by w pixels wide, a single frame includes 3×h×w bytes of data. Batching the input data over k frames of video data includes k×3×h×w bytes of data in the input video sequence 208. For example, the real encoder 210 can be configured to process the input video sequence 208 by increasing the depth of each frame from 3 bytes to 256 bytes while decreasing the height and width by a factor of four, yielding an output that includes k×256×(h/4)×(w/4) bytes of latent variable data. In other examples, real encoder 210 can output video sequences in other configurations, for example k×1024×(h/8)×(w/8) and so forth, where the bit depth is increased as the height and width decrease.

Dual VAE-GAN 200 also inputs simulated video sequences 214 including a plurality of simulated images (SIMG) 212 input to synthetic encoder (SENC) 216 of the VAE-GAN 200. As discussed above, simulated video sequences 214 are generated by photorealistic rendering software based on a scene description file that describes the scene to be rendered, including locations, shapes, sizes and textured corresponding to objects in the scene. The scene description file can also include environmental conditions including lighting, weather and seasonal effects. Lighting can include sunlight including time of day and cloud cover and artificial lighting. Weather can include atmospheric conditions including rain, snow or fog. Seasonal effects can include snow cover and foliage, i.e., leaves or bare branches. In similar fashion as discussed above in regard to the real encoder 210, the synthetic encoder 216 processes k frames of batched simulated video sequences 214 of size k×3×h×w bytes to form output data of size k×256×(h/4)×(w/4) bytes of latent variable data. In similar fashion to real encoder 210, the synthetic encoder 216 can output video sequences in other configurations, for example k×1024×(h/8)×(w/8) and so forth, where the bit depth is increased as the height and width decrease.

Real encoder 210 and synthetic encoder 216 both output latent variables to a shared latent space (SLS) 218. A shared latent space 218 can be trained to use a single set of latent variables corresponding to real video sequences 208 and simulated video sequences 214. A shared latent space 218 is a collection of latent variables output from both the real encoder 210 and the synthetic encoder 216. In a shared latent space 218, a single latent variable corresponds to latent variables output from the same relative position in both the real encoder 210 and the synthetic encoder 216. Using a single set of latent variables in a shared latent space 218 permits real video sequences 208 and simulated video sequences 214 to be input to either real decoder (RDEC) 220 or synthetic decoder (SDEC) 222. Real decoder 220 is trained using real images 206. Real decoder 220 processes batched real video 208 sequences in similar fashion to real encoder 210, where the real decoder 220 is configured to process a fixed number of real video sequence 208 frames. Real decoder 220 outputs reconstructed real video sequences 226 consisting of reconstructed real images (RRIMG) 224.

In similar fashion to real decoder 220, synthetic decoder 222 inputs latent variables and outputs reconstructed synthetic video sequences 230 consisting of reconstructed synthetic images (RSIMG) 228. Synthetic decoder 222 processes batched simulated video sequences 214 as discussed above in relation to synthetic encoder 216. In similar fashion to synthetic encoder 216, synthetic decoder 222 is arranged to process a fixed number of frames of simulated video sequence 214 data corresponding to batched simulated video sequences 214. Synthetic decoder 222 outputs reconstructed synthetic video sequences 230 consisting of frames of reconstructed synthetic images (RSIMG) 228. Dual VAE-GAN 200 can translate real video sequences 208 into reconstructed real video sequences 226 (real-to-real) where translation includes modifying the video sequence to include different environmental conditions. Dual VAE-GAN 200 can also translate simulated video sequences 214 to synthetic video sequences 230 (sim-to-synth), where translation includes modifying the input simulated video sequence 214 to make the output synthetic video sequences 230 appear more like real video data. By including a shared latent space 218, dual VAE-GAN 200 can also translate simulated video 214 data into real video sequences 226 (sim-to-real) by directing output from synthetic decoder 222 to real decoder 224 and translate real video sequences 208 into synthetic video sequences 230 (real-to-synth).

At training time, output from the real decoder 220 and synthetic decoder 222 are compared to input data to determine loss functions once per batch of video frames. Loss functions are determined for the generator portion of dual VAE-GAN 200, which includes the real encoder 210, the synthetic encoder 216, the real decoder 224 and the synthetic decoder 228. First the generator portion of the VAE-GAN 200 is trained based on VAE reconstruction loss. Real video sequences 208 are notated as $V_A$ and simulated video sequences 214 are notated as $V_B$. Using this notation, real-to-real translation of a real video sequence 208 is notated as $V_{A2A}$ and sim-to-synth translation is notated as $V_{B2B}$ In similar fashion, real-to-synth translation is notated as $V_{A2B}$ and sim-to-real translation is notated as $V_{B2A}$. Following this notation, reconstruction loss function, where output from real decoder 220 is compare to the input is notated as $V_{A2A}-V_A$ and simulated reconstruction loss function where output from synthetic decoder 222 is compared to the input as $V_{B2B}-V_B$. The loss functions $V_{A2A}-V_A$ and $V_{B2B}-V_B$ are applied to the real encoder 210/real decoder 220 and synthetic encoder 216/synthetic decoder 222, respectively. The generator portion of VAE-GAN 200 can be trained based on cycle consistency. Cycle consistency is used to train the generator when cross-reconstructed video sequences are output. Cross-reconstructed video sequences are produced when latent variables output from real encoder 220 are input to synthetic decoder 228 or latent variables output from synthetic encoder 222 are input to real decoder 224. In addition to reconstruction loss functions, cycle consistency loss functions can be determined for real-to-synth and sim-to-real translations. To determine cycle consistency, output from real-to-synth and sim-to-real translations is passed back through the sim-to-synth and real-to-real data paths of the dual VAE-GAN 200, respectively. This permits loss functions $V_{A2B2A}-V_A$ and $V_{B2A2B}-V_B$ to be determined and applied to the real encoder 210/real decoder 220 and synthetic encoder 216/synthetic decoder 222, respectively.

In addition to reconstruction losses and cycle consistency loss functions, adversarial loss functions can be determined based on output from discriminators 232, 234, 236 238. A discriminator 232, 234, 236 238 outputs a value between 0 and 1, where a 0 value indicates that the discriminator has detected a fake video sequence and a 1 indicates that the discriminator has detected an authentic video sequence. The notation introduced above is used to indicate the output from the VAE-GAN 200 and the functions $D_{IA}(\ )$, $D_{IB}(\ )$, $D_{VA}(\ )$, and $D_{VB}(\ )$ are used to indicate output from real image discriminator 232, synthetic discriminator 234, real video discriminator 236 and synthetic video discriminator 238, respectively. The adversarial loss functions for real image discriminators 232 and synthetic image discriminator 236 for both cross translation and cycle consistency are $D_{IA}(V_{B2A})-1$, $D_{IB}(V_{A2B})-1$, $D_{IA}(V_{A2B2A})-1$, and $D_{IB}(V_{B2A2B})-1$. The adversarial loss functions for real video discriminators 234 and synthetic video discriminator 238 for both cross translation and cycle consistency are $D_{VA}(V'_{B2A})-1$, $D_{VB}(V'_{A2B})-1$, $D_{VA}(V'_{A2B2A})-1$, and $D_{VB}(V'_{B2A2B})-1$, where the notation V' indicates that the output video sequence data is rearranged to stack the video frames along dimensions corresponding to the RGB color channels. The adversarial loss functions in this fashion are combined with the reconstruction and cycle consistency loss functions determined above and returned to the real encoder 210, synthetic encoder 216, real decoder 224 and synthetic decoder 230 to be backpropagated through the layers to determine weights based on minimum losses.

Adversarial loss functions for discriminators 232, 234, 236, 238 are determined based on discriminator 232,234, 236, 238 output and used to train the discriminators 232, 234, 236, 238. Using the same notation discussed above, adversarial loss functions for image discriminators 232, 236 are $[D_{IA}(V_{B2A})-0]+[D_{IA}(R_A)-1]$, $[D_{IB}(V_{A2B})-0]+[D_{IB}(R_B)-1]$, $[D_{IA}(V_{A2B2A})-0]+[D_{IA}(R_A)-1]$, and $[D_{IB}(V_{B2A2B})-0]+[D_{IB}(R_B)-1]$. Adversarial loss functions for video discriminators 234, 238 are $[D_{VA}(V'_{B2A})-0]+[D_{VA}(R'_A)-1]$, $[D_{VB}(V'_{A2B})-0]+[D_{VB}(R'_B)-1]$, $[D_{VA}(V_{A2B2A})-0]+[D_{VA}(R'_A)-1]$, and $[D_{VB}(V_{B2A2B})-0]+[D_{VB}(R'_B)-1]$, where the notations V' and R' indicates that the video sequences are rearranged to stack the video frames along dimensions corresponding to the RGB color channels. The adversarial loss functions for discriminators 232, 234, 236, 2387 is returned to the respective discriminators 232, 234, 236, 238 to be backpropagated through the layers of the discriminators 232, 234, 236, 238 to determine weights based on minimum loss functions.

Training of the dual VAE-GAN 200 includes outputting reconstructed real video sequences 226 to a real image discriminator (RIDIS) 232, outputting reconstructed real video sequences 226 to a real video discriminator (RVDIS) 234, outputting synthetic video sequences 230 to a synthetic image discriminator (SIDIS) 236, and outputting synthetic video sequences 230 to a synthetic video discriminator (SVDIS) 238. Real image discriminator 232 includes 2D convolution layers, real video discriminator 234 includes 2D and 3D convolutional layers, synthetic image discriminator 236 includes 2D convolutional layers and synthetic video discriminator 238 includes 2D and 3D layers. Real image discriminator 232, real video discriminator 234, synthetic image discriminator 236, and synthetic video discriminator 238 are trained using real video sequences to determine whether a video input to the discriminator is an authentic video sequence or a fake video sequence. Authentic in this context of the real discriminators 232, 234 refers to how close to a real image or video does a simulated image or video translated to real image or video (sim2real) look in terms of textures, lighting etc. Similarly, authentic in the context of synthetic discriminators 236, 238 refers to how close to a simulated image does the real2sim translation look. In this context, similar in appearance means that the output image or video sequence could not be distinguished from the input image or video sequence by an observer. A fake image or video typically would not be mistaken for an authentic image or video by an observer, for example.

Figure 3:
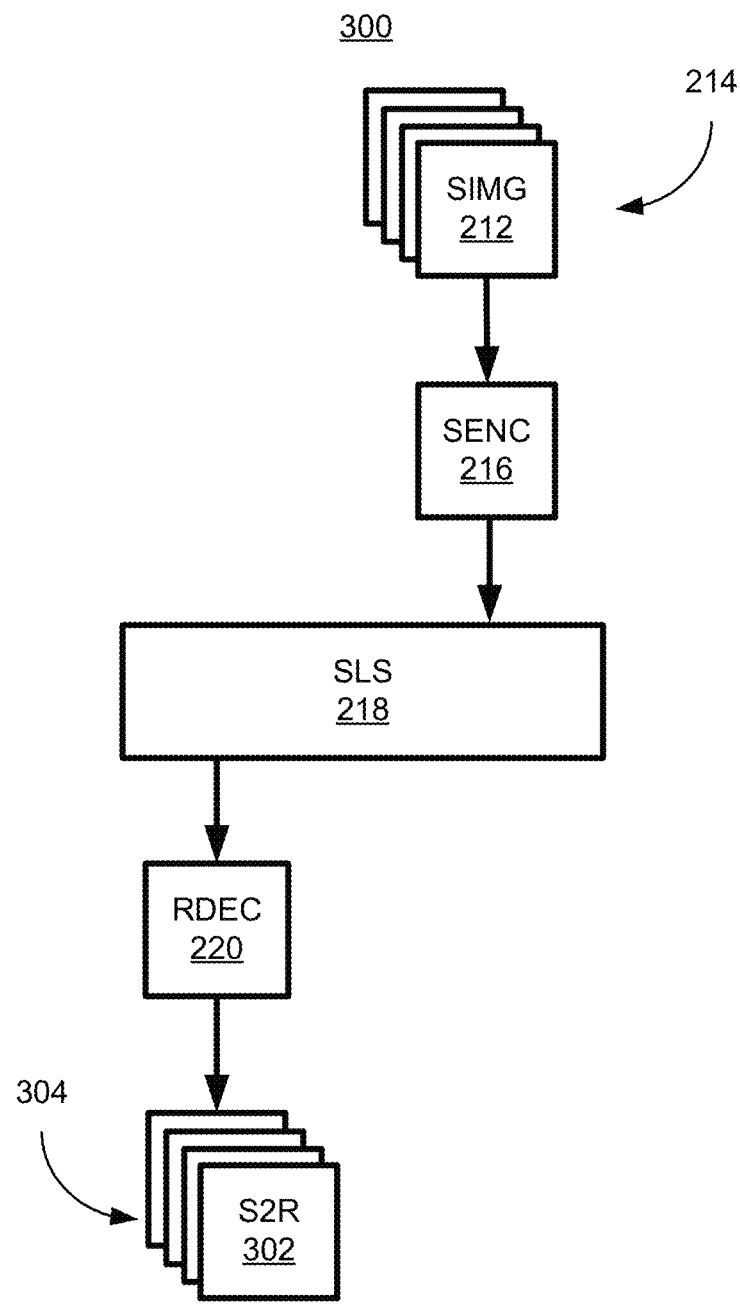
FIG. 3 is a diagram of an example variational autoencoder neural network.

FIG. 3 is a diagram of a dual VAE-GAN 300 configured for operation following training as discussed above in relation to FIG. 2. Training a dual VAE-GAN 200 as discussed in relation to FIG. 3 permits the dual VAE-GAN 300 to be configured to be used as a style transfer network. A style transfer network is a neural network that can be trained to retain style elements from one image domain and apply the style elements to another image domain. In examples discussed herein, the style elements correspond to environmental conditions including lighting, weather, and seasons. The image domains include a real domain including real video sequences 208 consisting of real images 206, and a simulated domain including simulated video sequences 214 consisting of simulated images 212. The dual VAE-GAN 200 can perform style transfer by being trained to encode and decode both real and simulated video sequences. Because both the real and simulated video sequences are processed using a shared latent space 218, simulated video sequences 214 consisting of simulated images 212 can be encoded by simulated encoder 216 into latent variables in shared latent space 218. The latent variables corresponding to simulated images 212 in simulated video sequences 214 can be outputted from the shared latent space 218 to real decoder 220 where they are translated as if they were real images 206 in a real video sequences 208, thereby transferring style elements from the real domain to the input simulated video sequence 214 from the simulated domain.

The dual VAE-GAN 300 can be configured to simulated video sequences 214 consisting of simulated images 212 to be processed by simulated encoder 216 and real decoder 220 to output translated video sequences 304 consisting of translated images (S2R) 302 that have been translated from a simulated domain to a real domain to look like real video sequences 208 consisting of real images 206. A style transfer network such as dual VAE-GAN 200 can be trained to translate real video sequences 208 from one particular environmental condition, for example daylight conditions, to an output real video sequence 226 that includes different environmental conditions, for example nighttime, i.e., real-to-real transformation. The dual VAE-GAN 200 can also be trained to translate simulated video sequences 214 from one set of environmental conditions to a synthetic video sequence 230 that includes different environmental conditions that appears more realistic than the input simulated video sequence 214, i.e., sim-to-synth transformation. Because the dual VAE-GAN 200 includes a shared latent space 218, output from real encoder 210 can be input to synthetic decoder 228 and output from synthetic encoder 216 can be input to real decoder 224. This provides translated real video output from simulated video input or sim-to-real translation and synthetic video output from real video input or real-to-synth translation.

A dual VAE-GAN 300, trained as discussed in relation to FIG. 2, can be used to generate video sequences to be used to train a deep neural network to label and locate and track objects. An object label is a text string that identifies an object in an image 206, 212, such as "vehicle" or "pedestrian". An object location is a location of the object in pixel coordinates or real world coordinates relative to the camera that acquired the image or video data. As discussed above, training a deep neural network can require thousands of annotated images. Video sequences used for training deep neural networks can require that each frame of video data be annotated with data regarding object labels and locations. Each type of environmental condition in the training dataset should have a plurality of examples of different objects in different locations at different orientations to the camera. Acquiring and annotating real video data corresponding to a large number of combinations of environmental conditions can require very expensive data acquisition tasks and a very expensive and time-consuming effort to annotate the data. Techniques discussed herein can generate a large number of simulated images and video sequences with annotation generated based on the scene description files used to generate the simulated data without requiring input of labels. A smaller number of real images and real video sequences requiring less expense and time can be used to train a plurality of dual VAE-GANs 200 to generate a plurality of environmental conditions. The trained dual VAE-GANs 200 can be configured to generate a large number of annotated and translated/photorealistic video sequences 304 consisting of annotated reconstructed real video sequences 302 for training a deep neural network with efficiencies such as mentioned above over training with annotated real images and videos.

Dual VAE-GANs 200, 300 as discussed herein improve style transfer of video sequences for training deep neural networks by including real and simulated video discriminators 234, 238. Typically, style transfer networks that transfer styles for video sequences are based on recurrent neural networks. Recurrent neural networks incorporate memory to process video sequences by saving a plurality of copies of the recurrent neural network. Real and simulated video discriminators 234, 238 reduce or even eliminate the need for recurrent neural networks and therefore decrease the computing resources required to perform style transfer processing on video sequences.

Figure 4:
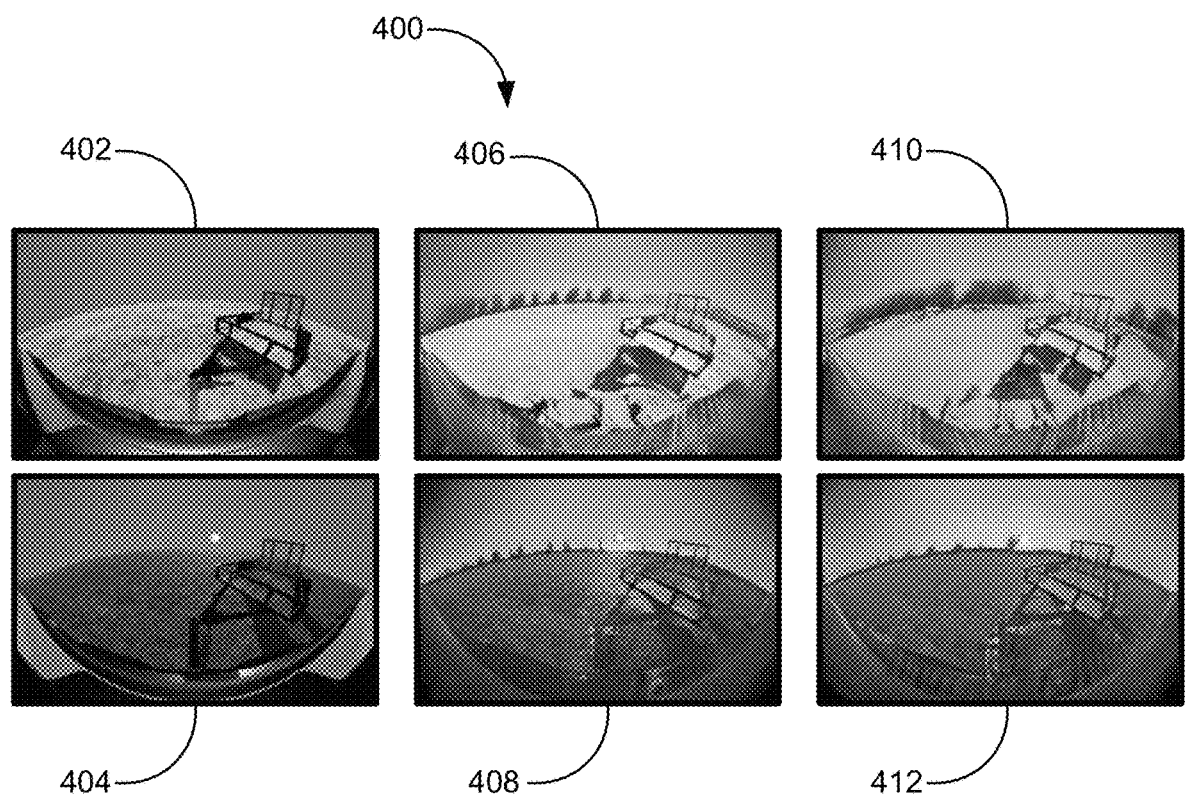
FIG. 4 is a diagram of example images.

FIG. 4 is a diagram of images 400 from simulated video sequences and sim-to-real translated video sequences. Simulated images 402, 404 are raw simulated images from video sequences generated by a photo realistic rendering software program. Images 406, 408 are sim-to-real translated images from simulated video sequences 214 processed by a VAE-GAN 200 trained using 2D video discriminators 234, 238. Images 410, 412 are reconstructed simulated images from a simulated video 214 processed by a VAE-GAN 200 trained using 3D video discriminators 234, 238. Real and simulated video discriminators 234, 238 can include either 2D or 3D convolution. 2D convolution spatially convolves one image of a video sequence at a time. 3D convolution can simultaneously convolve both spatially and temporally a plurality of video frames to preserve continuity between translated video frames in addition to continuity provided by the stacking of input images along channel dimension in VAE-GAN 200 at input to the video discriminators 234, 238. 2D convolution is faster and requires fewer computing resources than 3D convolution. 3D convolution can provide more accurate results at the cost of requiring more time and computing resources. For generating annotated video datasets for training deep neural networks, the increased accuracy from 3D convolutions is generally worth the extra time and computing resources required.

Figure 5:
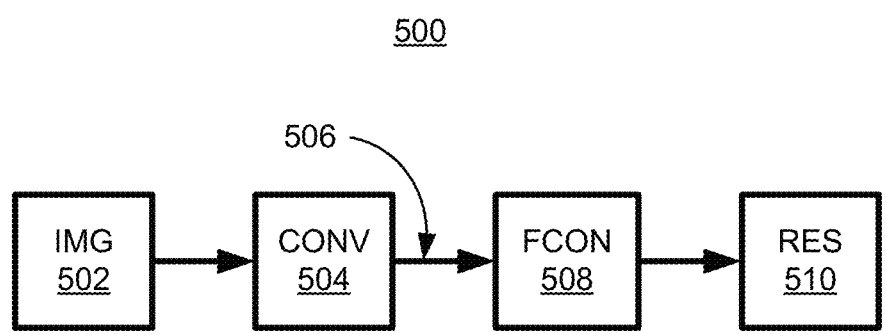
FIG. 5 is a diagram of an example deep neural network.

FIG. 5 is a diagram of a deep neural network (DNN) 500 that can be trained by using output from dual VAE-GANs 200, 300 discussed above. Following generating a training dataset that includes a plurality of annotated sim-to-real translated simulated video sequences 304 consisting of annotated sim-to-real translated simulated images 302 including a plurality of environmental conditions, the training dataset can be used to train a DNN. A DNN 500 includes convolutional layers (CONV) 504 and fully-connected layers (FCON) 508. Image data (IMG) 502 is input to the convolutional layers 504 which output latent variables 506 to fully-connected layers 508. The fully-connected layers 508 output results (RES) 510, which can include labels and locations corresponding to objects included in the input images 502.

DNNs 500 are trained by inputting image 502 data and determining a loss function based on the output results 510 and ground truth data determined based on data describing objects included in the annotated reconstructed simulated video sequence 304 that corresponds to the input image 502. The loss function determines a loss value that can be fed back to the convolutional layers 504 and fully-connected layers 508 where it is backpropagated through the layers 504, 508 to determine weights that provide the correct result 510. The processing and calculation of loss functions occurs a plurality of times until the loss value is minimized, meaning that the output result 510 most closely matches the ground truth. The weights that correspond to the minimum loss value are stored. When the dataset is processed, the weights that provide the smallest loss values for the largest number of input images can be selected as the weights to be retained as programming for the trained DNN 500.

Figure 6:
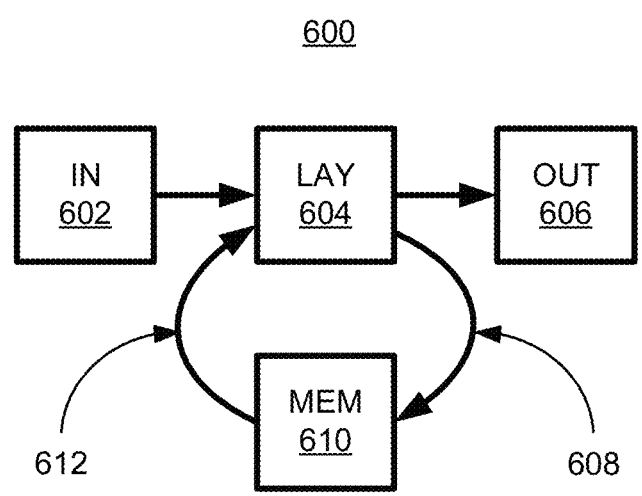
FIG. 6 is a diagram of a recurrent deep neural network.

FIG. 6 is a diagram of a recurrent DNN 600 configured to provide video output for use in tracking objects. Recurrent DNN 600 includes convolutional layers and fully-connected layers (LAY) 604 making recurrent DNN 600 a recurrent convolutional deep neural network. A recurrent DNN 600 adds inputs 612 and outputs 608 and memory 610 to the convolutional layers and fully-connected layers 604 of recurrent DNN 600. A sequence of input images 602, $x_1$, $x_2$, ... $x_n$. As each input image $x_i$ is processed by the layers 604 of recurrent DNN 600, hidden variables generated by the layers 604 are output 608 from the layers 604 and stored in memory 610. As the next input image $x_{i+1}$ is input to layer 604, hidden variables generated based on input image $x_i$ are recalled from memory 610 are input 612 to the layers 604 along with the input image $x_{i+1}$ to generate an output prediction 606. In this fashion data from all of the frames of an input video sequence $x_1$, $x_2$, ... $x_n$. can be used to determine the output prediction 606. Because the final output prediction 606 based on video frame $x_n$ includes data from all of the video frames, the final output prediction 606 can include tracking data for objects in the video sequence.

Recurrent DNNs 600 are trained in similar fashion to DNNs 500, where output predictions 606 are compared to ground truth to determined loss functions. The trained recurrent DNN 600 can then be provided for use in a system 100 such as a vehicle, robot, security system, safety system or product tracking system, etc. In an example, the trained recurrent DNN 600 can be downloaded to a vehicle to execute on a computing device 115, which acquires image data from vehicle sensors 116 to input to the recurrent DNN 600. Predictions 606 output from the recurrent DNN 600 can be used by the computing device 115 to operate the vehicle 110. Computing device 115 can determine a vehicle path upon which to operate vehicle 110 based on tracked objects output by recurrent DNN 600. A vehicle path can be specified by a polynomial function based on the location and direction of the vehicle 110 that describes the location of the vehicle 110 with respect to a roadway. The vehicle path can be determined to avoid contact with tracked objects output by a recurrent DNN 600, for example where the tracked objects include other vehicles and pedestrians. The computing device 115 can command one or more controllers 112 to control vehicle powertrain, vehicle brakes, and vehicle steering to cause the vehicle 110 to travel along the vehicle path while maintaining upper and lower limits on longitudinal and lateral accelerations.

Figure 7:
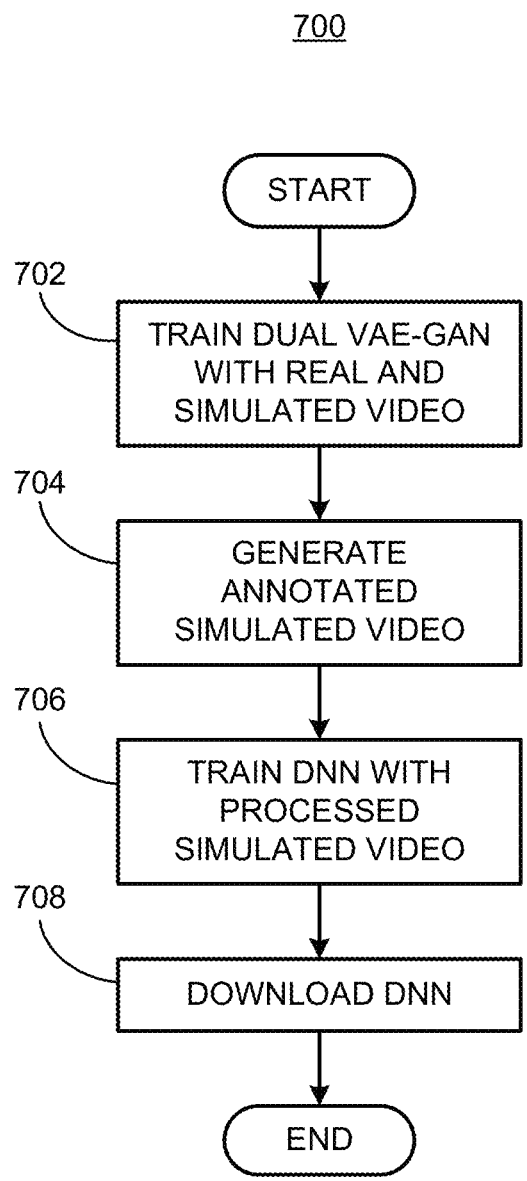
FIG. 7 is a flowchart diagram of an example process to train a deep neural network.

FIG. 7 is a diagram of a flowchart, described in relation to FIGS. 1-5, of a process for training a dual VAE-GAN 200 to generate an annotated image and video dataset for training a DNN 500. Process 700 can be implemented by a processor of computing device, taking as input information from sensors, and executing commands, and outputting object information, for example. Process 700 includes multiple blocks that can be executed in the illustrated order. Process 700 could alternatively or additionally include fewer blocks or can include the blocks executed in different orders.

Process 700 begins at block 702, where a computing device, which can be located in a cloud-based server computer 120, trains a dual VAE-GAN 200 to generate reconstructed real video sequences 226, reconstructed simulated video sequences 230 based on input real video sequences 208, and input simulated video sequences 214, respectively, as discussed in relation to FIG. 2, above. Dual VAE-GAN 200 is trained to perform style transfer, in this example to transfer style elements corresponding to environmental conditions from real video sequences 208 to reconstructed real video sequences 304 determined based on input simulated video sequences 214.

At block 704 the trained dual VAE-GAN 300 can be configured to input simulated images 212 and simulated video sequences 214 and output reconstructed simulated images 302 and reconstructed simulated image sequences 304 that include style elements corresponding to environmental conditions from real images 206 and real video sequences 208. The reconstructed simulated images 302 and reconstructed simulated video sequences 304 include corresponding annotation data based on scene description files used to generate the simulated images 212 and simulated video sequences 214 input to the VAE-GAN 300.

At block 706 a recurrent DNN 600 can be trained using the reconstructed real images 302 and reconstructed synthetic video sequences 304 and corresponding annotation data as discussed in relation to FIG. 5, above.

At block 708 the trained recurrent DNN 600 is downloaded to a vehicle 110, for example. In other applications, the trained recurrent DNN 600 can be downloaded to a computing device and used for security, safety, or product tracking applications as discussed above. Following block 708 process 700 ends.

Figure 8:
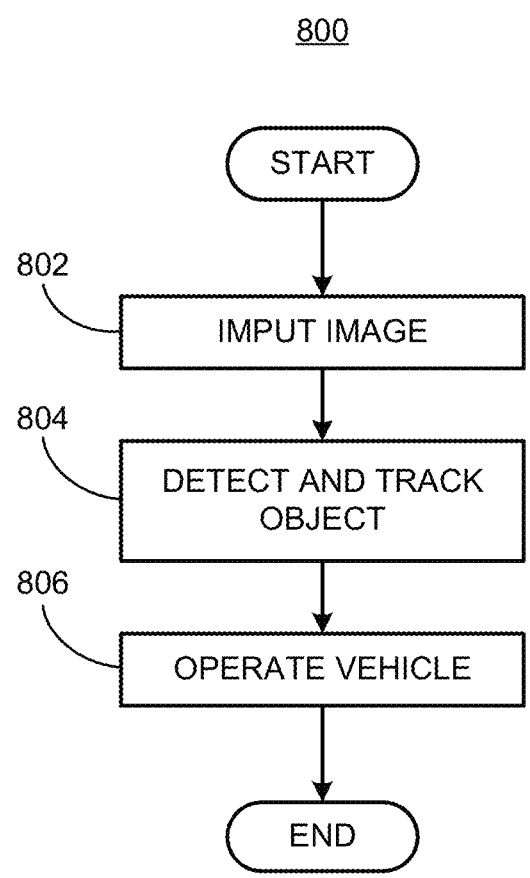
FIG. 8 is a flowchart diagram of an example process to operate a vehicle using a deep neural network.

FIG. 8 is a diagram of a flowchart, described in relation to FIGS. 1-6, of a process for operating a vehicle 110 using a trained recurrent DNN 600. Process 800 can be implemented by a processor of computing device, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802 where a trained recurrent DNN 600 is executing on a computing device 115 included in a vehicle 110. The recurrent DNN 600 has been trained according to a process 700 as described in FIG. 7 and downloaded to the computing device 115 included in the vehicle 110. At block 802 an image 502 is acquired from a sensor 116 included in the vehicle 110 and input to recurrent DNN 600.

At block 804 the recurrent DNN 600 processes the image 502 to determine label, location and tracking data for at least one object included in the image 502. For example, recurrent DNN 600 can determine a label including "vehicle" or "pedestrian", determine a location for the object and track the object over a video sequence. The object location can be described in terms of pixel location within the image or, if the orientation and location of the sensor is known with respect to a ground plane such as a roadway surface, the object location can be described in real world coordinates relative to the vehicle. Based on the time between frames of video data, the object locations can be processed by recurrent DNN 600 can track the object by determining a trajectory for the object, where trajectory includes direction and speed.

At block 806 the object label and tracking data can be used to operate the vehicle 110. As discussed above in relation to FIG. 5, the computing device 115 can command controllers 112, 113, 114 to control vehicle powertrain, vehicle brakes, and vehicle steering to cause vehicle 110 to operate on a determined vehicle path. Following block 806 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
train a dual variational autoencoder-generative adversarial network (VAE-GAN) to transform a real video sequence and a simulated video sequence by inputting the real video sequence into a real video decoder and a real video encoder and inputting the simulated video sequence into a synthetic video encoder and a synthetic video decoder;
determine real loss functions and synthetic loss functions based on output from a real video discriminator and a synthetic video discriminator, respectively, wherein the real video discriminator and the synthetic video discriminator rearrange the video sequences to stack the video frames along dimensions corresponding to the RGB color channels and wherein the real video discriminator and the synthetic video discriminator are trained using loss functions determined based on real video sequences and synthetic video sequences;
backpropagate the real loss functions through the real video encoder and the real video decoder to train the real video encoder and the real video decoder based on the real loss functions;
backpropagate the synthetic loss functions through the synthetic video encoder and the synthetic video decoder to train the synthetic video encoder and the synthetic video decoder based on the synthetic loss functions;
train the real video discriminator and the synthetic video discriminator to determine an authentic video sequence from a fake video sequence using the real loss functions and the synthetic loss functions;
transform an annotated simulated video sequence with the synthetic video encoder and the real video decoder of the dual VAE-GAN to generate an annotated reconstructed real video sequence that includes style elements based on the real video sequence; and
train a deep neural network using the reconstructed annotated real video sequence to detect and track objects in video data.

2. The computer of claim 1, the instructions including further instructions to train the deep neural network based on comparing ground truth for the objects with output from the deep neural network.

3. The computer of claim 2, wherein the ground truth is determined based on data describing the objects included in the annotated reconstructed real video sequence.

4. The computer of claim 1, wherein the style elements include environmental conditions including lighting, weather, and seasons.

5. The computer of claim 1, the instructions including further instructions to generate the annotated simulated video sequence with photorealistic video rendering software.

6. The computer of claim 5, the instructions including further instructions to generate ground truth based on data describing the objects included in the annotated reconstructed real video sequence.

7. The computer of claim 1, wherein the dual VAE-GAN includes a shared latent space including latent variables corresponding to both the real video sequence and the simulated video sequence.

8. The computer of claim 1, wherein the real video discriminator and the synthetic video discriminator are convolutional neural networks.

9. The computer of claim 1, wherein the deep neural network is a recurrent convolutional deep neural network.

10. The computer of claim 9, the instructions including further instructions to operate a vehicle based on detecting and tracking the objects in the video data with the recurrent convolutional deep neural network.

11. A method, comprising:
training a dual variational autoencoder-generative adversarial network (VAE-GAN) to transform a real video sequence and a simulated video sequence by inputting the real video sequence into a real video decoder and a real video encoder and inputting the simulated video sequence into a synthetic video encoder and a synthetic video decoder;
determining real loss functions and synthetic loss functions based on output from a real video discriminator and a synthetic video discriminator, respectively, wherein the real video discriminator and the synthetic video discriminator rearrange the video sequences to stack the video frames along dimensions corresponding to the RGB color channels and wherein the real video discriminator and the synthetic video discriminator are trained using loss functions determined based on real video sequences and synthetic video sequences;
backpropagating the real loss functions through the real video encoder and the real video decoder to train the real video encoder and the real video decoder based on the real loss functions;
backpropagating the synthetic loss functions through the synthetic video encoder and the synthetic video decoder to train the synthetic video encoder and the synthetic video decoder based on the synthetic loss functions;
training the real video discriminator and the synthetic video discriminator to determine an authentic video sequence from a fake video sequence using the real loss functions and the synthetic loss functions;
transforming an annotated simulated video sequence with the synthetic video encoder and the real video decoder of the dual VAE-GAN to generate an annotated reconstructed real video sequence that includes style elements based on the real video sequence; and
training a deep neural network using the reconstructed annotated real video sequence to detect and track objects in video data.

12. The method of claim 11, further comprising training the deep neural network based on comparing ground truth for the objects with output from the deep neural network.

13. The method of claim 12, wherein the ground truth is determined based on data describing the objects included in the annotated reconstructed real video sequence.

14. The method of claim 11, wherein the style elements include environmental conditions including lighting, weather, and seasons.

15. The method of claim 11, further comprising generating the annotated simulated video sequence with photorealistic video rendering software.

16. The method of claim 15, further comprising generating annotations based on data describing the objects included in the annotated reconstructed real video sequence.

17. The method of claim 11, wherein the dual VAE-GAN includes a shared latent space including latent variables corresponding to both the real video sequence and the simulated video sequence.

18. The method of claim 11, wherein the real video discriminator and the synthetic video discriminator are convolutional neural networks.

19. The method of claim 11, wherein the deep neural network is a recurrent convolutional deep neural network.

20. The method of claim 19, further comprising operating a vehicle based on detecting and tracking the objects in the video data with the recurrent convolutional deep neural network.

* * * * *